June 5, 1951  L. D'AMELIO  2,555,787
WIND MOTOR FOR DRIVING VARIABLE STROKE PISTON PUMPS
Filed May 13, 1948
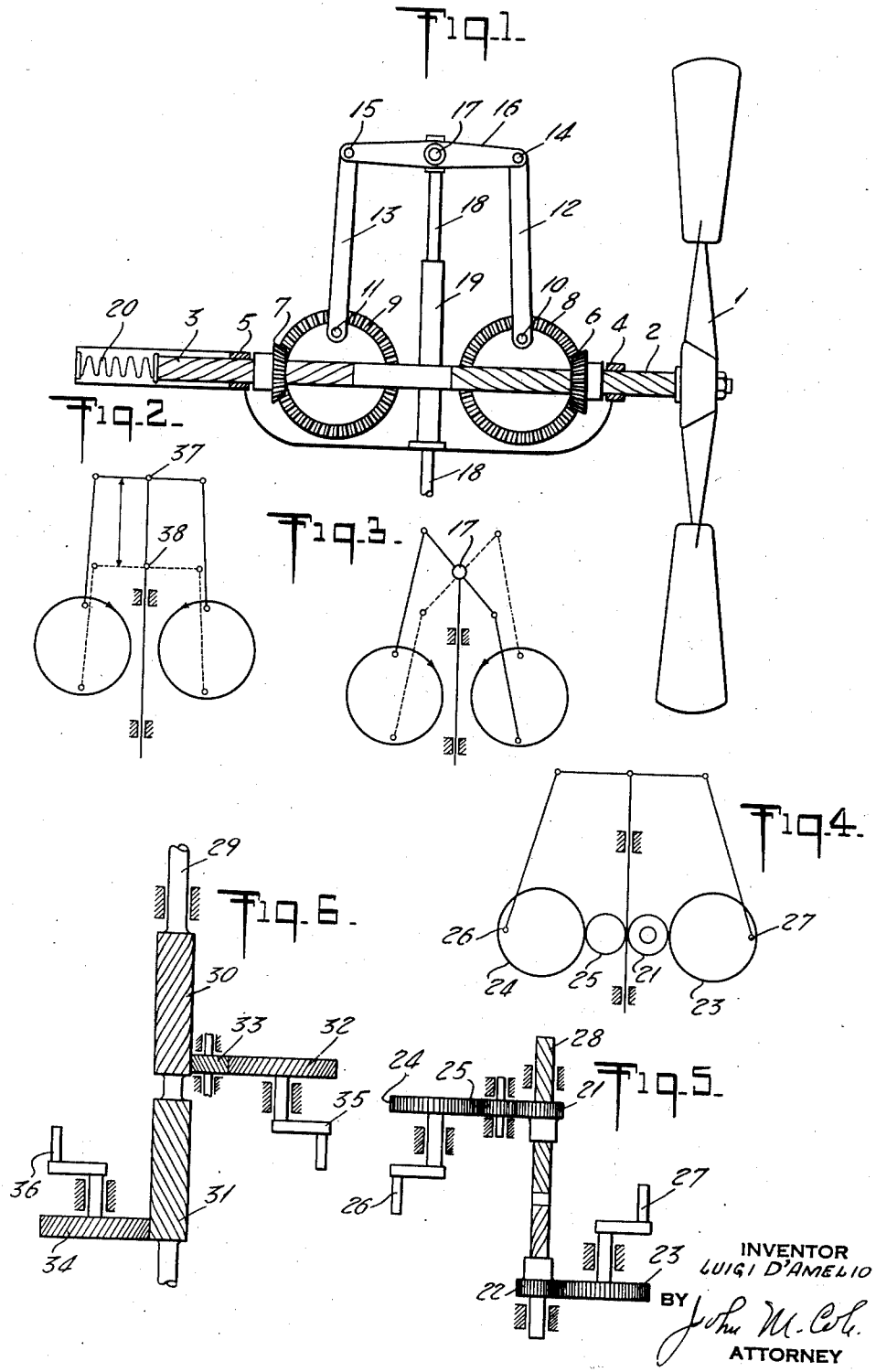
INVENTOR
LUIGI D'AMELIO
BY
John M. Cole
ATTORNEY Patented June 5, 1951

2,555,787

UNITED STATES PATENT OFFICE 2,555,787

WIND MOTOR FOR DRIVING VARIABLE STROKE PISTON PUMPS

Luigi D'Amelio, Naples, Italy, assignor of one-half to Joseph L. Bonanno, Madison, N. J.

Application May 13, 1948, Serial No. 26,845

5 Claims. (Cl. 103—38)

The present invention has for its object the design of a wind motor for driving piston pumps in which the average and the maximum resistive torque vary in close approximation and automatically, as a function of the square of the wind velocity. The object of this invention is the most economical utilization of the available energy of the wind by maintaining the peripheral velocity of the wind mill in a constant relation to the velocity of the wind or as another variation, maintaining the ratio at such a value as to give the highest efficiency. In order to obtain this relation it is necessary that both the average as well as the maximum resistive torque of the driven machine in this case, a piston pump, shall vary in direct relation to the available torque of the motor when operating at its highest efficiency. In the case of a wind mill of any given dimensions this couple is proportionate to the square of the wind velocity.

This relation is obtained by making the stroke of the piston pump also vary as the square of the wind velocity, so that at any given setting the average torque and the maximum torque which are directly proportionate to the stroke also vary according to the above law. The accompanying drawings show, for purposes of illustrating the present invention, one embodiment in which the invention may take form, it being understood that the drawings are illustrative of the invention rather than limiting the same.

In these drawings,

Figure 1 is a diagrammatic view illustrating a wind motor driving a variable stroke pump;

Figures 2 and 3 are diagrammatic views illustrating the parts in different positions;

Figures 4 and 5 are diagrammatic views illustrating a modified form of construction; and Figure 6 is a diagrammatic view illustrating a still further modified form of construction employing helical gears.

A practical form of this invention is shown in Figure 1 which shows a layout of a wind motor driving a variable stroke pump. The variable stroke is obtained in the following manner. The wind mill Figure 1 which can be made with any number of helical blades is firmly keyed to one end of the shaft 2—3 mounted on the bearings 4—5 which form part of the casing of the motor. This shaft can slide axially along its bearings. The other extremity of the shaft bears on the thrust spring 20 which in the absence of wind and therefore of axial thrust keeps the shaft in the extreme right hand position. Under the action of the wind which produces a thrust on the wind mill proportionate to the square of the wind velocity, the spring 20 is compressed and the shaft 2—3 moves towards the left. Since the deformation of the spring is proportional to the load, the distance moved towards the left will be proportional to the thrust of the wind upon the wind mill. The thrust in turn varies as a square of the wind velocity. It is quite evident then, that as the wind velocity varies, the movement of the shaft towards the left will be a function of the square of the wind velocity.

The shaft 2—3 drives two bevel pinions 6—7. These bevel pinions are attached to the shaft by means of left and right hand helical splines and, being restrained from axial movement they can only rotate as the shaft moves in the axial direction. Due to the use of a left and right hand helical spline the angular displacement of these pinions with respect to each other will be double that of each pinion with respect to the shaft.

The two equal bevel pinions 6—7 drive with any desired reduction ratio two equal beveled wheels 8—9 mounted in the same plane and free to rotate about two shafts which are fixed to the motor casing. Both of these beveled wheels carry a crank pin 10—11 fixed at the same distance from its respective shaft centers. To each of these crank pins there is attached a connecting rod 12—13 and the other end of these connecting rods is in turn pinned to the end of a balancing link 16. The center of this balancing link is pinned to the end of the pump shaft 18 which moves in the guide sleeve 19 which is in turn fixed to the casing of the motor. Pin 17 can therefore move only in a straight line along the axis of the sleeve. For any given position of the shaft as for example that shown in Figure 1 let us suppose that the crank pins 10—11 are in the uppermost position and we shall take this position as the center point of rotation. Rotating the main shaft without an accompanying axial displacement (a condition which will obtain when the wind velocity is constant) will cause the crank pins to move with the same angular velocity and they will return after each revolution to their original position. In this case, the pin 17 on the balancing link will move in a straight line with a definite displacement. This distance as shown in Figure 2 is determined by the distance between points 37—38. In the case of the wind velocity diminishing a relative rotation of the two pinions will be produced because of the shifting of the left and right hand helical splines which will in turn produce a relative shift in the phase of the two crank pins.

The design of the mechanism is so proportioned that the shifting of the main shaft from the extreme right to the extreme left in Figure 1 will cause the two crank pins to shift 180° in phase as shown in Figure 3. In this position of the crank pins, the pin 17 on the balancing link will not move axially but the balancing link itself will simply oscillate about pin 17, in other words the stroke will be zero.

For any intermediate position of the shaft, the phase relation of the crank pins will lie between zero and 180° and the stroke will vary from the maximum indicated above and zero.

The movement of point 17 and the stroke of the pump will therefore be in close approximation to the axial displacement of the shaft. Since the shaft moves proportionately with the wind thrust, the stroke will vary in close approximation to this thrust and hence in proportion to the square of the wind velocity. The pitch of the helical spline is chosen so as to form an irreversible drive, that is, the pinion can rotate when the shaft moves axially but the pinions cannot in turn cause axial motion of the shaft.

Another variation of this design is shown in Figures 4 and 5. In this case the beveled gears 6—7 of Figure 1 are replaced by spur gears 21—22, also driven by the shaft 28 through a helical spline. These pinions drive the two spur gears 23—24. Between the gears 21—24, an idler 25 is inserted in order to maintain the directional rotation as shown in Figure 1. The crank pins 26—27 will also be located in the same plane as shown in Figure 1. These will drive the balancing link through connecting rods which are not shown in Figure 5. In all of these arrangements the left and right hand helical spline can be replaced by left and right hand helical gears as shown in Figure 6. In this arrangement the pinion is keyed rigidly to the shaft and the axial movement of the shaft will produce the same angular phase shift between the helical gears 32—34. In the case shown in Figure 6 the gear 32 is driven by the pinion 30 through an idler 33.

The cranks 35—36 here also in the same plane drive through connecting rods (not shown), the balancing link and the shaft of the pump as in the previous cases. The angle of the helices is chosen to be less than the critical angle of friction so as to constitute an irreversible drive as explained before. This invention has been described and illustrated in a preferred form but it is understood that variation thereof can be built without departing from the teachings of this patent.

What is claimed is:

1. Apparatus for automatically varying the stroke of a reciprocating pump including a pump rod, comprising an axially movable and rotatable shaft, a windmill mounted on said shaft, for driving said shaft and for moving said shaft axially in one direction, in response to the thrust of the wind on the windmill, spring means cooperating with said shaft for urging it axially in the opposite direction, against the thrust of the windmill, whereby the shaft assumes an axial position depending on the velocity of the wind, a balancing link for operating the pump rod, arms connected to opposite ends of said balancing link, and means angularly positioned in accordance with the axial position of said shaft, for operatively connecting said arms to said shaft.

2. Apparatus for automatically varying the stroke of a reciprocating pump including a pump rod, comprising an axially movable and rotatable shaft, a windmill mounted on said shaft, for driving said shaft and for moving said shaft axially in one direction, in response to the thrust of the wind on the windmill, spring means cooperating with said shaft for urging it axially in the opposite direction, against the thrust of the windmill, whereby the shaft assumes an axial position depending on the velocity of the wind, a balancing link for operating the pump rod, arms connected to opposite ends of said balancing link, and means, including gears driven by said shaft and angularly positionable in accordance with the axial position assumed by said shaft, for operatively connecting said shaft to said arms.

3. Apparatus for automatically varying the stroke of a reciprocating pump including a pump rod, comprising an axially movable and rotatable shaft, a windmill mounted on said shaft, for driving said shaft and for moving said shaft axially in one direction, in response to the thrust of the wind on the windmill, spring means cooperating with said shaft for urging it axially in the opposite direction, against the thrust of the windmill, whereby the shaft assumes an axial position depending on the velocity of the wind, a balancing link for operating the pump rod, arms connected to opposite ends of said link for operating it, gear wheels operatively connected with said arms, and gears meshing with said gear wheels, said gears being carried by said shaft and angularly positionable thereon, the angular positioning of said gears being controlled by the axial position assumed by said shaft under different wind conditions.

4. A drive for a reciprocating pump, comprising a shaft rotatably driven by a windmill and axially movable in one direction, in response to the thrust of the wind, a spring for urging the shaft in the opposite direction, against the thrust of the wind, two gears helically splined to the shaft to rotate therewith and positionable at varying angles thereon, in accordance with the axial position of said shaft, two gear wheels, respectively meshing with said gears, connecting arms operatively connected with said gear wheels, and a balancing link operatively connected with the pump, the ends of said link being connected to respective connecting arms, whereby the stroke of the pump is automatically varied in accordance with the velocity of the wind.

5. Apparatus for automatically varying the stroke of a reciprocating pump including a pump rod, comprising an axially movable and rotatable shaft, a windmill mounted on said shaft, for driving said shaft and for moving said shaft axially in one direction, in response to the thrust of the wind on the windmill, spring means cooperating with said shaft for urging it axially in the opposite direction, against the thrust of the windmill, whereby the shaft assumes an axial position depending on the velocity of the wind, and means for operatively connecting said shaft to the pump rod including means angularly positionable in accordance with the axial position of said shaft and means for varying the stroke of said pump rod in accordance with the angularity of said angularly positionable means.

LUIGI D'AMELIO.

REFERENCES CITED

The following references are of record in the file of this patent:

UNITED STATES PATENTS

| Number | Name | Date |
| --- | --- | --- |
| 841,601 | Summers et al. | Jan. 15, 1907 |
| 871,024 | Beates | Nov. 12, 1907 |
| 2,327,787 | Heintz | Aug. 24, 1943 |
| 2,435,711 | Crofton | Feb. 10, 1948 |

FOREIGN PATENTS

| Number | Country | Date |
| --- | --- | --- |
| 101,963 | Australia | Sept. 16, 1937 |
| 450,347 | Great Britain | July 15, 1936 |